Sept. 20, 1949.    E. T. WYMAN    2,482,394
GAS TURBINE
Filed Feb. 12, 1945
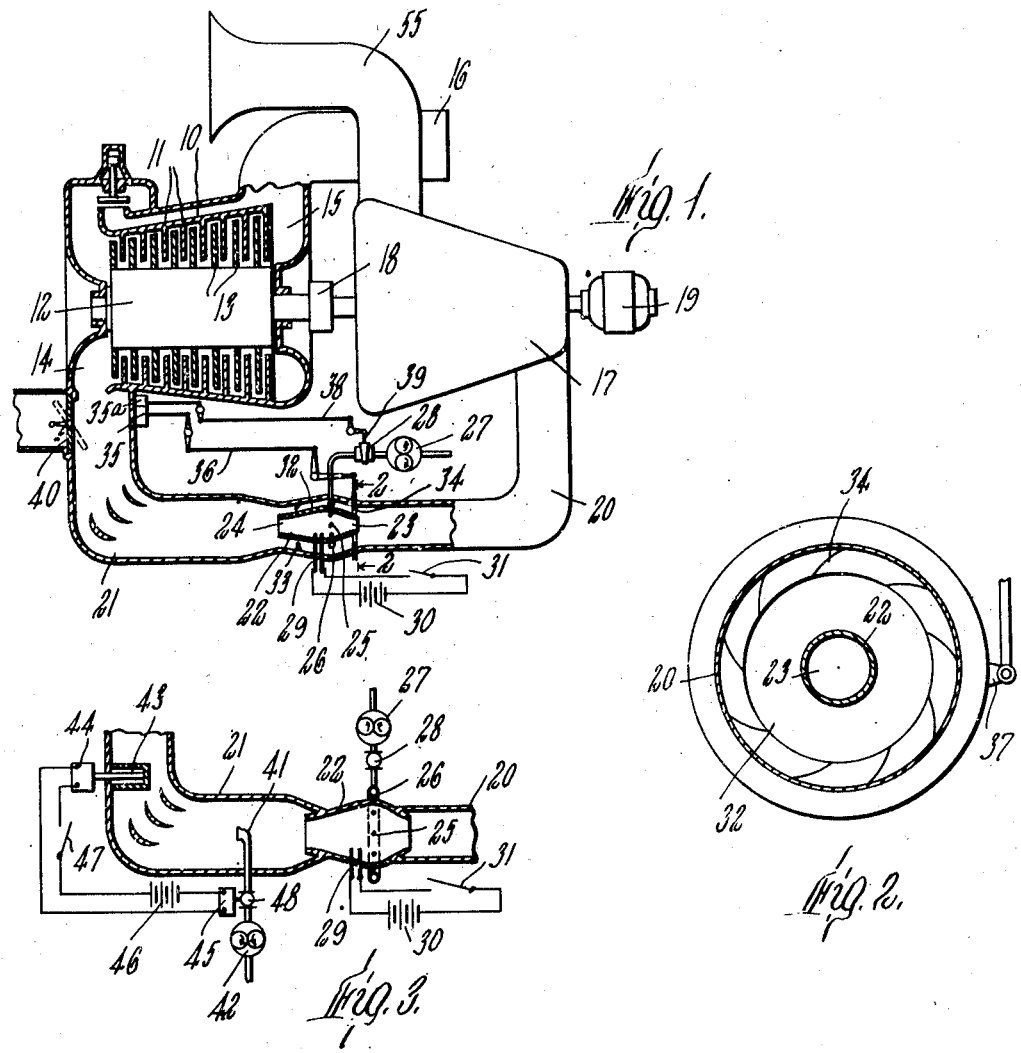
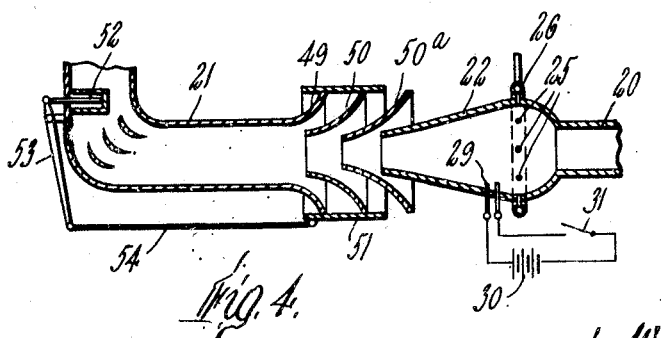
Inventor
George T. Wyman
by Wright, Brown, Quinby
& May Attys.

Patented Sept. 20, 1949

2,482,394

UNITED STATES PATENT OFFICE 2,482,394

GAS TURBINE

Edwin T. Wyman, Brookline, Mass.

Application February 12, 1945, Serial No. 577,502

5 Claims. (Cl. 60—41)

This invention relates to turbines of the type which are driven by hot gases composed of air compressed by the power of the turbine and combined with gases generated by the combustion of fuel in the compressed air. It is of the same general nature as those shown in my prior applications for United States Patent Serial No. 514,809, filed December 18, 1943, and Serial No. 544,715, filed July 13, 1944, now Patent Nos. 2,469,678 and 2,469,679, granted May 10, 1949. Like the engines shown in said prior applications, this invention includes a turbine, an air compressor driven by the turbine, means for conducting air from the outlet of the compressor to the intake of the turbine, and means for burning fuel so as to augment the volume and pressure of the gases which enter the turbine.

The main objects of the invention are to reduce the load imposed on the air compressor in developing a given pressure and velocity in the working fluid and augment the efficiency of transforming heat energy into increased velocity and pressure of the working fluid. In the accomplishment of these objects I have introduced into the engine combination a thermodynamic air duct known as an "athodyd" as a velocity accelerator for the air delivered by the compressor, while retaining other useful elements and accessories shown in said prior applications.

The principles of turbine engines by which the foregoing objects are realized and in which the invention consists are shown in the accompanying drawing, in diagrammatic form, and described in the following specification; a number of illustrative embodiments of such principles being so shown and described.

In the drawing,

Fig. 1 is a diagrammatic elevation, partly in section, of one form of gas turbine embodying the invention;

Fig. 2 is a detail section taken on line 2—2 of Fig. 1 and drawn on a larger scale, showing a part of the velocity accelerator and control means therefor;

Fig. 3 is a sectional view of part of a somewhat different form of air conducting and velocity accelerating means together with means for injecting water into the hot gases and means for controlling the supply of water thereto;

Fig. 4 is a sectional view similar to Fig. 3 showing a further variation of the principles of the invention.

Like reference characters designate the same parts wherever they occur in all the figures.

This engine combination includes a turbine of the type shown in my before mentioned prior applications having a housing 10 supporting stationary guide vanes 11 and a rotor 12 carrying encircling blades or buckets 13 which are arranged in rows interspersed with rows of stationary guide vanes, in any manner usual or satisfactory for turbines driven by vaporous or gaseous working fluid. An annular intake passage 14 leads to the smaller end of the turbine and an annular exhaust chamber 15 opens from the larger end of the turbine and is connected with an exhaust duct 16.

An air compressor 17 is coupled with the rotor of the turbine by a clutch 18, which preferably is a one way clutch adapted to transmit driving torque from the rotor of the turbine to that of the compressor and to permit independent rotation in the same direction of the compressor rotor. The compressor here shown is of the axial type such as that shown in my application Serial No. 514,809, now Patent No. 2,469,678, but a centrifugal compressor of the type described in my application Serial No. 544,715, now Patent No. 2,469,679, may be used equally well.

A starting motor 19, which may be of any type but is preferably an electric motor, is coupled to the rotor of the compressor, preferably by a one-way clutch so organized as to transmit torque to the compressor rotor in the same direction that the turbine rotor rotates under impulsion of the working fluid. However, the turbine rotor, compressor rotor and starting motor, or either two of them, may be mounted on one shaft, or directly connected otherwise than by the clutches described.

The exhaust outlet of the compressor opens into a conduit 20 which is connected in series or tandem with a conduit 21 leading to the intake passage 14 of the turbine; these conduits collectively constituting the duct or conducting means for carrying the output of the compressor to the turbine intake. A thermodynamic air duct or velocity accelerator 22 known as an "athodyd" (an abbreviation for words "aero thermo-dynamic duct") is located in a portion of this conducting means, preferably a portion which is straight for a substantial distance.

This velocity accelerator or athodyd 22 is a tube of open interior and varying internal diameters, having an entrance orifice 23 at one end directed against the stream of air flowing from the conduit 20, being enlarged in diameter internally (and preferably, though not necessarily, externally also) with gradual enlargement away from the entrance end and being tapered from its largest diameter with a nozzle-like form to the opposite end, in which there is a discharge orifice 24.

A fuel burner is located to inject fuel into the large-diameter portion of the accelerator. Preferably a number of burner nozzles 25 are arranged, as shown, in an encircling zone, all coupled with an annular supply conduit 26. The fuel may be liquid, gaseous or finely divided powdered solid fuel supplied under sufficient pressure to be distributed widely when emitted from the nozzle or nozzles. I have here shown an installation adapted for liquid fuel, in which a pump 27 transfers oil from a supply source past a control valve 28 to the annular conduit 26. The nozzle or nozzles may be of any character suitable to spray or otherwise distribute the fuel in a manner suitable to promote rapid combustion.

An electric igniter 29 is mounted inside the accelerator tube in a location which enables it to ignite the fuel. It may be of any acceptable type, such as a spark plug, and may be supplied with energy from any suitable source. A battery 30 and control switch 31 are here shown as typifying the power source.

The principle on which the velocity accelerator or athodyd 22 here shown operates is this. Air enters its admission orifice 23 at high velocity. Immediately within the orifice it is slowed down momentarily by reason of the enlarged diameter of the tube and the back pressure, and is simultaneously compressed by the fast moving air entering behind it, which acts like a ram. The compressed air goes into combustion with the fuel and the hot gases expand. This expansion takes place in the tapering rear portion of the tube and steps up the velocity of the gases, expelling them in a jet into the conduit 21.

The high-velocity jet issuing from the accelerator tube entrains air through the surrounding annular space 32 in the conduit. The additional air thus flowing into the conduit 21 is mixed with the products of combustion from the accelerator tube, cooling them to a workable temperature; that is, a temperature low enough to avoid injury to the vanes or blades of the turbine. Materials are available for making such blades and vanes which can withstand safely extremely high temperatures, and the cooling effect of the added air brings the temperature of the gas mixture within the limit of safety. The gas in conduit 21 then flows to the turbine and impels its rotor.

Preferably the walls of that part of the air conducting conduit which surrounds the accelerator tube or athodyd 22 are formed with a profile similar to that of the accelerator, in order effectively to promote the air flow. I also prefer to mount in the annular space between the outer walls and the accelerator tube, helicoidal guide vanes 33 or equivalent means capable of imparting whirling movement to the air stream therein so as to facilitate mixing of that air stream with the products of combustion from the accelerator tube. I also prefer to regulate the volume of air passing through the annular space, and I have shown here a regulator 34 in the form of an iris diaphragm composed of overlapping plates similar to those of the conventional iris diaphragm of a camera and similarly operable to obstruct the annular space more or less. Any other type of valve suitable for the purpose may be used however. The regulating valve and means for giving the air stream a whirling motion may be combined in one device, if desired, instead of being separate appliances as here shown. The statements of preference in this paragraph are not limitations, and either the guide vanes or the regulator may be omitted without departure from the invention.

The air valve 34 and fuel valve 28 are regulated, either manually, or automatically by means under control of the temperature or pressure, or both temperature and pressure existing at a selected part of the air conduit leading to the turbine. I have here shown for this purpose thermostats 35 and 35a mounted on the wall of conduit 21, one of which is connected by a linkage 36 with the valve controller 37 (Fig. 2), and the other is connected by a linkage 38 with the stem 39 of a valve body in valve 28. These thermostats and linkages are organized to reduce the fuel supply and open valve 34 more widely when the temperature of gas entering the turbine becomes higher than a prescribed degree, and vice versa when the temperature falls below the prescribed degree.

The igniter 29 may be operated continuously or intermittently as needed to maintain continuous combustion of fuel in the accelerator tube.

A door 40 or damper is provided in the wall of the conduit 21, preferably near the intake of the turbine and may be organized to be opened and closed either automatically or manually. When open it permits flow of gases from the conduit directly into the outer space, affording an easier path for flow of the gases than that through the turbine when the latter is at rest and enabling the velocity accelerator to commence functioning. It may be opened before or when the engine is started, and held open until the gases flow through conduit 21 sufficiently rapidly to effect the ram action and compression of air in the duct 22 necessary to initiate the before-described operation of the accelerator, and cause quick starting or acceleration of the turbine. When that stage of rapidity has been reached, the door is closed and the gases flow into the turbine with enough momentum to overcome the inertia of the rotor.

The form of invention shown in Fig. 3 differs from that shown in Fig. 1, in that there is no annular air flow passage between the velocity accelerator tube 22 and the conduits 20 and 21, but these conduits are connected with the accelerator so that all of the air delivered from the compressor passes through the accelerator and no additional air is mixed in the conduit 21 with the hot gases coming from the accelerator. The conduit 21, however, is substantially larger in transverse area that the outlet from the accelerator tube, whereby the gases entering it are slowed down and simultaneously compressed by the faster moving gases from the accelerator. Water is injected into the chamber within the conduit 21 by a spray head 41. A pump 42 delivers water from any suitable source to the spray head and the delivery to the latter is controlled thermostatically by a thermostat 43, a variable current switch 44 operable by the thermostat, and a solenoid valve actuator 45 in circuit with the switch 44 and with a source of electric current 46 and a main switch 47. The valve actuator 45 opens or closes a valve 48 in the supply line to the spray head 41, in greater or less degree and in a prescribed relation to the temperatures of the fluid passing to the turbine. The heat of the gases immediately converts the water to steam and is diminished to a safe temperature thereby. Other liquids than water may be used here.

The fuel supply means and igniting means used in this arrangement may be the same as those shown in Fig. 1. In so far as they are represented in Fig. 3, the same reference characters are used. It will be understood without special illustration that the fuel supply may be controlled thermostatically, as previously described, or otherwise.

A further embodiment of the invention, shown in Fig. 4, is constructed to conduct all of the air delivered from the compressor into the velocity accelerator tube, as in the arrangement shown in Fig. 3, but additional air is taken from the atmosphere into the conduit 21 under entrainment by the high velocity jet from the accelerator tube and with control as to its quantity by the temperature of the gases in conduit 21. The conduit 21 is open at the entrance end to the open air and is spaced apart from the outlet of the accelerator tube sufficiently to permit passage of air through the intervening space. Its open end is preferably made flaring with convex curvature in profile, as shown at 49, to facilitate entrance of the jet and secondary air. For effective control of the inflowing air, there is provided one, two or more tapering guide vanes or funnels 50 and 50a, of similar formation to the flaring end of the conduit 21, arranged in axial alinement with the latter and spaced apart therefrom, from each other, and from the discharge orifice of the accelerator tube. A valve 51, made preferably as a sleeve arranged to surround closely the large ends of the flaring part 49 and the funnels, is mounted to be movable endwise so as to open or close the intermediate spaces in greater or less measure.

The sleeve 51 may be thus moved manually or automatically in response to temperature differences of the gases in the conduit 21. The means for so moving it may comprise a thermostat 52, a lever 53 or equivalent multiplying motion transmitter, and a link 54 connected to the lever and sleeve; all organized and operable to move the sleeve in the direction for shutting off the passageways between the funnels when the temperature is low, and for moving it in the direction to admit more air when the temperature rises. Pressure and velocity are imposed on the entering air by the high velocity jet and it cools the hot gases of the jet.

In all the embodiments and combined arrangements of the thermodynamic air duct or athodyd embodying this invention, the duct performs an important service in supplying working fluid to the turbine under sufficient pressure and with efficient velocity. Its boosting action on the air relieves the compressor of a large part of the work necessary to deliver working fluid to the turbine, enabling the latter to deliver air at a much lower pressure than would otherwise be the case. In addition it increases the efficiency of the entire apparatus.

In order further to relieve the load on the compressor, I have devised an intake conduit 55 for the compressor having a flaring open mouth into which relatively moving air can enter. If the engine combination is carried by a moving vehicle such, for instance, as an aircraft of any type or a high speed surface vehicle, the mouth of conduit 55 is directed in the line of movement of the vehicle. With some velocities of relative air flow, the air can be passed into the compressor at a pressure high enough to relieve in considerable measure the load sustained by the compressor in delivering air at a desired or prescribed velocity.

It is to be understood that any of the auxiliary features shown in my before named applications may be embodied in the combination herein described. For instance, the exhaust gases from the turbine and the air flowing into the compressor may pass through a heat interchanger; an additional condenser may be interposed in the exhaust flue from the turbine to condense vapors in the spent gases; the liquid condensed from the gases may be returned to the spray head 41 in the combination shown in Fig. 3; pressure relieving bypasses may be connected around the fuel pump and the water pump, etc.; as will be understood from the disclosures of said applications.

What I claim is:

1. In a power plant of the turbine-compressor type having a conduit connecting the compressor and turbine, an athodyd-shaped body disposed in said conduit, having fuel nozzles for feeding fuel into said body at its area of maximum diameter, and ignition means for igniting said fuel therein, whereby air entering said body is first momentarily slowed down, then compressed by the in-rushing air behind it, and then ejected forwardly at greatly increased velocity by the combustion of the fuel therein.

2. In a power plant of the turbine-compressor type having a conduit connecting the compressor and turbine, an athodyd-shaped body disposed axially in said conduit and spaced from the walls thereof, having fuel nozzles for feeding fuel into said body at its area of maximum diameter, and ignition means for igniting said fuel therein, whereby air entering said body is first momentarily slowed down, then compressed by the in-rushing air behind it, and then ejected forwardly at greatly increased velocity by the combustion of the fuel therein.

3. In a power plant of the turbine-compressor type having a conduit connecting the compressor and turbine, an athodyd-shaped body disposed in said conduit having fuel nozzles for feeding fuel into said body at its area of maximum diameter, and ignition means for igniting said fuel therein, a door downstream of the athodyd-shaped body adapted to be opened to atmosphere to reduce back pressure while the turbine is being started, whereby air entering said body is first momentarily slowed down, then compressed by the in-rushing air behind it, and then ejected forwardly at greatly increased velocity by the combustion of the fuel therein.

4. In a power plant of the turbine-compressor type having a conduit connecting the compressor and turbine, an athodyd-shaped body axially disposed in said conduit and forming an integral part of the walls thereof, said body having fuel nozzles for feeding fuel into said body at its area of maximum diameter, and ignition means for igniting said fuel therein, whereby air entering said body is first momentarily slowed down, then compressed by the in-rushing air behind it, and then ejected forwardly at greatly increased velocity by the combustion of the fuel therein.

5. In a power plant of the turbine-compressor type having a conduit connecting the compressor and turbine, an athodyd-shaped body axially disposed in said conduit and forming an integral part of the walls thereof, said body having fuel nozzles for feeding fuel into said body in its area of maximum diameter, and ignition means for igniting said fuel therein, and said conduit having air ports disposed in said conduit below said athodyd-shaped body and valve means for regulating the flow of air into said conduit through said ports, whereby air entering said body is first momentarily slowed down, then compressed by the in-rushing air behind it, and then ejected forwardly at greatly increased velocity by the combustion of the fuel therein.

EDWIN T. WYMAN.

REFERENCES CITED

The following references are of record in the file of this patent:

UNITED STATES PATENTS

| Number | Name | Date |
|---|---|---|
| 972,504 | Brown | Oct. 4, 1910 |
| 1,273,466 | Doble | July 23, 1918 |
| 2,056,198 | Lasley | Oct. 6, 1936 |
| 2,078,957 | Lysholm | May 4, 1937 |
| 2,195,025 | Couzinet | Mar. 26, 1940 |
| 2,219,994 | Jung | Oct. 29, 1940 |
| 2,256,198 | Hahn | Sept. 16, 1941 |
| 2,326,072 | Seippel | Aug. 3, 1943 |
| 2,332,866 | Muller | Oct. 26, 1943 |
| 2,353,929 | Ray | July 18, 1944 |

FOREIGN PATENTS

| Number | Country | Date |
|---|---|---|
| 416,030 | Great Britain | Sept. 3, 1934 |
| 620,680 | France | Apr. 27, 1927 |